United States Patent
Aoyagi et al.

(10) Patent No.: US 12,427,613 B2
(45) Date of Patent: Sep. 30, 2025

(54) TOOLING EXCHANGE MECHANISM AND MACHINE TOOL HAVING THE TOOLING EXCHANGE MECHANISM

(71) Applicants: CITIZEN WATCH CO., LTD., Tokyo (JP); CITIZEN MACHINERY CO., LTD., Nagano (JP)

(72) Inventors: Atsushi Aoyagi, Kitasaku-gun (JP); Kazutoshi Kitazawa, Kitasaku-gun (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 445 days.

(21) Appl. No.: 18/020,181

(22) PCT Filed: Sep. 30, 2021

(86) PCT No.: PCT/JP2021/036042
§ 371 (c)(1),
(2) Date: Feb. 7, 2023

(87) PCT Pub. No.: WO2022/080144
PCT Pub. Date: Apr. 21, 2022

(65) Prior Publication Data
US 2023/0294227 A1    Sep. 21, 2023

(30) Foreign Application Priority Data
Oct. 13, 2020   (JP) ................. 2020-172352

(51) Int. Cl.
*B23Q 3/157* (2006.01)
*B23B 29/24* (2006.01)
(Continued)

(52) U.S. Cl.
CPC .............. *B23Q 3/157* (2013.01); *B23B 29/24* (2013.01); *B23B 29/34* (2013.01); *B23B 31/06* (2013.01);
(Continued)

(58) Field of Classification Search
CPC .......... B23Q 3/157; B23Q 3/155; B23Q 3/12; B23Q 2003/15586; B23B 29/24;
(Continued)

(56) References Cited

U.S. PATENT DOCUMENTS 5,054,176 A * 10/1991 Wachter ............. B23Q 3/15546
82/159
5,065,492 A * 11/1991 Von Haas ............. B23B 29/046
29/426.6
(Continued)

FOREIGN PATENT DOCUMENTS

JP          H0811009 A      1/1996
JP          2019-188499 A   10/2019

*Primary Examiner* — Ryan J. Walters
(74) *Attorney, Agent, or Firm* — CANTOR COLBURN LLP (57) ABSTRACT

A tooling exchange mechanism and a machine tool having the tooling exchange mechanism, in which a load applied to a turret is reduced when exchanging a tooling in the machine tool, are provided with a pressing member 210 of a tooling detachment unit 200 that presses the rear end of a tooling holding unit 100 to be able to release the retracted state of a tool holder Th of a tooling T by a tool holder holding portion 150 of the tooling holding unit 100, and a locking lever 220 of the tooling detachment unit 200 engageable with an engaging projection 112a formed on the rear end side of the tooling holding unit 100.

6 Claims, 6 Drawing Sheets

(51) Int. Cl.
  *B23B 29/34* (2006.01)
  *B23B 31/06* (2006.01)
  *B23B 31/107* (2006.01)
  *B23B 31/26* (2006.01)
  *B23Q 3/155* (2006.01)
  *B23B 29/32* (2006.01)
  *B23Q 3/12* (2006.01)

(52) U.S. Cl.
  CPC .......... *B23B 31/107* (2013.01); *B23B 31/263* (2013.01); *B23Q 3/155* (2013.01); *B23B 29/323* (2013.01); *B23B 2231/50* (2013.01); *B23B 2260/136* (2013.01); *B23Q 3/12* (2013.01); *B23Q 2003/15586* (2013.01)

(58) Field of Classification Search
  CPC ....... B23B 29/34; B23B 31/06; B23B 31/107; B23B 31/263; B23B 29/323; B23B 2231/50; B23B 2260/136
  See application file for complete search history.

(56) References Cited

U.S. PATENT DOCUMENTS

| | | | |
|---|---|---|---|
| 10,213,887 B2 * | 2/2019 | Aoyagi | ................... B23Q 5/04 |
| 11,858,084 B2 * | 1/2024 | Giesler | ................... B23B 29/34 |

\* cited by examiner

TOOLING EXCHANGE MECHANISM AND MACHINE TOOL HAVING THE TOOLING EXCHANGE MECHANISM

TECHNICAL FIELD

The present invention relates to a tooling exchange mechanism and a machine tool having the tooling exchange mechanism.

BACKGROUND ART

Conventionally, as a tool exchange mechanism in a turret to which a tool spindle unit for rotatably fixing a tool for machining a workpiece is attached, a mechanism has been known, in which a pressing member of the tool spindle unit is pressed from the outside to move forward a rod being in contact with the tip of the pressing member so as to detach the tool mounted on the tip of the rod (see, for example, Patent Literature 1).

CITATION LIST

Patent Literature

[Patent Literature 1] JP 2019-188499 A

SUMMARY OF INVENTION

Technical Problem

In such a tool exchange mechanism, since the rear side of the tool spindle unit is pressed, an excessive bending moment is applied to the unit holding portion of the turret, and an excessive load is applied to the turret. Thus, there has been room for further improvement in the durability of the turret.

Accordingly, the present invention solves the above-described problem of the prior art. That is to say, the object of the present invention is to provide a tooling exchange mechanism and a machine tool having the tooling exchange mechanism in which the load applied to the turret is reduced when exchanging a tooling in the machine tool.

Solution to Problem

Firstly, the present invention is directed to a tooling exchange mechanism for a machine tool including: a turret mounted with a tooling holding unit (tooling holder) or detachably holding a tooling including a rotary tool for machining a workpiece and a tool holder for detachably holding the rotary tool; and a turret support including a tooling detachment unit (tooling detacher) for detaching the tooling mounted to the tooling holding unit from the tooling holding unit, wherein the tooling holding unit mounted to the turret includes a tool holder holding portion for mounting the tool holder in a state where the tool holder of the tooling is retracted, the tooling detachment unit of the turret support includes a pressing member that is movable forward and backward in the direction to the rear end of the tooling holding unit and a locking lever that is movable forward and backward in the direction parallel to the moving direction of the pressing member, the pressing member of the tooling detachment unit press the rear end of the tooling holding unit to be able to release the retracted state of the tool holder of the tooling by the tool holder holding portion of the tooling holding unit, the locking lever of the tooling detachment unit is engageable with an engaging projection formed on the rear end side of the tooling holding unit, and after the pressing member of the tooling detachment unit comes into contact with the rear end of the tooling holding unit, while the locking lever of the tooling detachment unit is engaged with the engaging projection of the tooling holding unit, the pressing member of the tooling detachment unit moves forward to release the retracted state of the tool holder of the tooling by the tool holder holding portion of the tooling holding unit so that the tooling can be exchanged.

Secondly, in the present invention, the tooling detachment unit includes an elastic member for biasing the tooling detachment unit itself toward the turret.

Thirdly, in the present invention, after the pressing member of the tooling detachment unit comes into contact with the rear end of the tooling holding unit, reaction force, which the pressing member receives from the tooling holding unit, is greater than the biasing force of the elastic member.

Fourthly, the present invention is directed to a machine tool comprising: a tooling exchange mechanism described above; a spindle for rotatably gripping the workpiece; and a tooling storage device for storing the tooling, wherein after the turret is rotated to a predetermined tooling exchange position, the pressing member of the tooling detachment unit presses forward the rear end side of the tooling holding unit, and the locking lever of the tooling detachment unit pulls backward the engaging projection of the tooling holding unit.

Advantageous Effect of Invention

The present invention can provide the following effects.

(1) After the pressing member of the tooling detachment unit comes into contact with the rear end of the tooling holding unit, while the locking lever of the tooling detachment unit is engaged with the engaging projection of the tooling holding unit, the pressing member of the tooling detachment unit moves forward to release the retracted state of the tool holder of the tooling by the tool holder holding portion of the tooling holding unit so that the tooling can be exchanged. Thus, while the pressing member of the tooling detachment unit presses forward the rear end side of the tooling holding unit, the locking lever of the tooling detachment unit pulls backward the engaging projection of the tooling holding unit. Therefore, the bending moment applied to the turret can be canceled, and the load applied to the turret can be reduced when changing the tooling.

(2) The tooling detachment unit includes an elastic member for biasing the tooling detachment unit itself toward the turret. Thus, before the pressing member of the tooling detachment unit comes into contact with the rear end of the tooling holding unit, the locking lever of the tooling detachment unit is held in a position forward of the engaging projection of the tooling holding unit. Therefore, it is possible to prevent the locking lever of the tooling detachment unit from coming into contact with the engaging projection of the tooling holding unit due to vibrations generated during machining of a workpiece.

(3) After the pressing member of the tooling detachment unit comes into contact with the rear end of the tooling holding unit, reaction force, which the pressing member receives from the tooling holding unit, is greater than the biasing force of the elastic member. Thus, after the pressing member of the tooling detachment unit comes into contact with the rear end of the tooling holding unit, the locking lever of the tooling detachment unit is engaged with the engaging projection of the tooling holding unit, and the pressing member of the tooling detachment unit moves forward in that state. Therefore, the retracted state of the tool holder of the tooling can be released in a state where the bending moment applied to the turret is canceled.

(4) The machine tool comprises: a tooling exchange mechanism; a spindle for rotatably-gripping the workpiece; and a tooling storage device for storing the tooling, wherein after the turret is rotated to a predetermined tooling exchange position, the pressing member of the tooling detachment unit presses forward the rear end side of the tooling holding unit, and the locking lever of the tooling detachment unit pulls backward the engaging projection of the tooling holding unit. In this way, the tooling can be exchanged by the tooling exchange mechanism and can be exchanged between the tooling exchange mechanism and the tooling storage device. Therefore, the bending moment applied to the turret can be canceled to reduce the load applied to the turret, so that the tooling can be exchanged in a state where the load applied to the turret is reduced.

DESCRIPTION OF EMBODIMENTS

The specific embodiment of the present invention may be arbitrary as long as a tooling exchange mechanism for a machine tool comprises: a turret mounted with a tooling holding unit (tooling holder) for detachably holding a tooling including a rotary tool for machining a workpiece and a tool holder for detachably holding the rotary tool; and a turret support including a tooling detachment unit (tooling detacher) for detaching the tooling mounted to the tooling holding unit from the tooling holding unit, wherein the tooling holding unit mounted to the turret includes a tool holder holding portion for mounting the tool holder in a state where the tool holder of the tooling is retracted, the tooling detachment unit of the turret support includes a pressing member that is movable forward and backward in the direction to the rear end of the tooling holding unit and a locking lever that is movable forward and backward in the direction parallel to the moving direction of the pressing member, the pressing member of the tooling detachment unit press the rear end of the tooling holding unit to be able to release the retracted state of the tool holder of the tooling by the tool holder holding portion of the tooling holding unit, the locking lever of the tooling detachment unit is engageable with an engaging projection formed on the rear end side of the tooling holding unit, and after the pressing member of the tooling detachment unit comes into contact with the rear end of the tooling holding unit, while the locking lever of the tooling detachment unit is engaged with the engaging projection of the tooling holding unit, the pressing member of the tooling detachment unit moves forward to release the retracted state of the tool holder of the tooling by the tool holder holding portion of the tooling holding unit so that the tooling can be exchanged, as a result of which the load applied to the turret can be reduced when changing the tooling in the machine tool.

EXAMPLE

Hereinafter, a tooling exchange mechanism and a machine tool having a tooling exchange mechanism of one example of the present invention will be described below with reference to FIGS. 1 to 6D.

<1. Overview of a Machine Tool>

First, an overview of a machine tool 10 will be described with reference to FIGS. 1 and 2.

Figure 1:
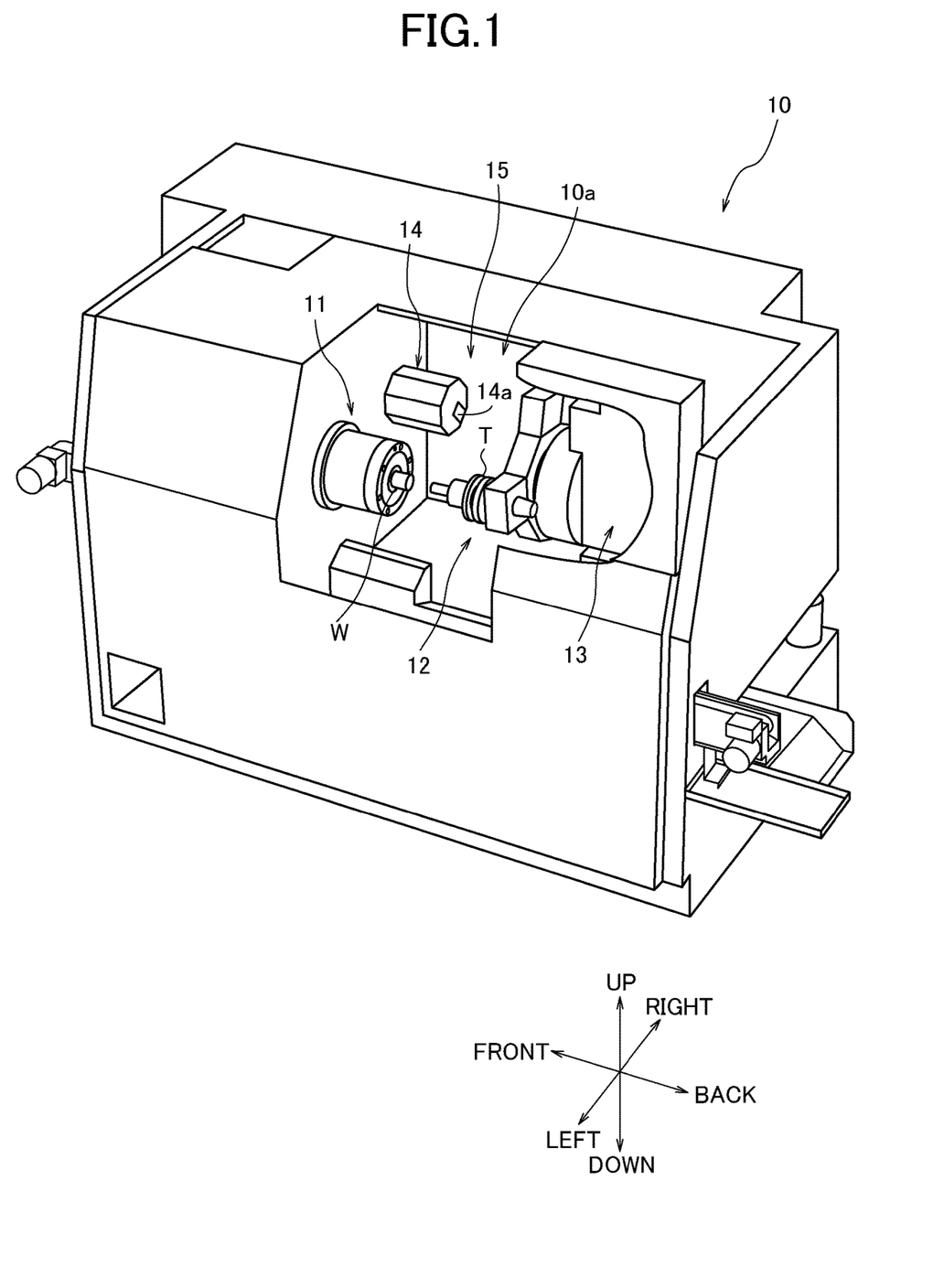
FIG. 1 is a perspective view of a machine tool incorporating a tooling exchange mechanism according to an example of the present invention.
Figure 2:
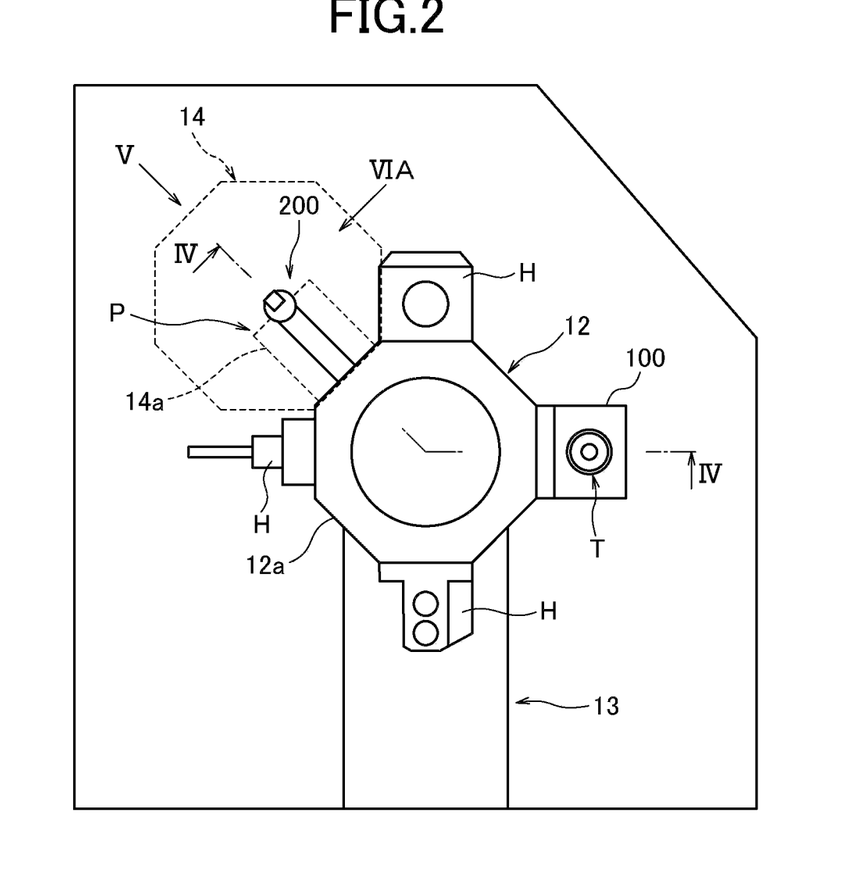
FIG. 2 is a front view of a turret illustrated in FIG. 1.

FIG. 1 is a perspective view of a machine tool incorporating a tooling exchange mechanism of an example of the present invention, and FIG. 2 is a front view of a turret shown in FIG. 1.

The machine tool 10 is an automatic lathe and has a machining chamber 10a for machining a workpiece W.

Inside the machining chamber 10a, as shown in FIG. 1, there are provided a spindle 11 for rotatably and detachably gripping the workpiece W, a turret 12 arranged opposite to the spindle 11, a turret support 13 for supporting the turret 12 so that the turret 12 is rotatably indexed, and a tooling storage device 14 for storing and exchanging a tool and a tooling to be mounted to the turret 12.

As shown in FIG. 2, the turret 12 is octagonal in a front view.

A tool holder H for holding a machining tool is detachable from each turret surface 12a, which is the peripheral surface of the turret 12.

A tooling holding unit 100 (tooling holder) for detachably holding a tooling T is mounted to one surface of the turret surfaces 12a.

On the other hand, the turret support 13 is linearly movable forward, backward, left, right, up and down by a not-shown support moving mechanism.

Therefore, since the turret 12 is integrated with the turret support 13, the turret 12 is also linearly movable forward, backward, left, right, up and down.

In this way, in the machine tool 10, the turret 12 approach the workpiece W, which is gripped by the spindle, by the support moving mechanism, and the workpiece W can be machined by a tool selected by the indexing and rotating operation of the turret 12.

Further, the turret support 13 is provided with a tooling detachment unit 200 (tooling detacher) for detaching the tooling T from the tooling holding unit 100.

The above-described tooling storage device 14 is arranged on the same side as the spindle 11, is movable in the front-back direction, which is the axial direction of the spindle 11, and has a shutter 14a on the front side.

A plurality of toolings is accommodated inside the tooling storage device 14, and a plurality of toolings same as the tooling T held by the tooling holding unit 100 can also be accommodated.

Further, the machine tool 10 is provided with a tooling exchange mechanism 15 for detaching the tooling T in order to automatically exchange the tooling T mounted to the tooling holding unit 100 for a tooling accommodated in the tooling storage device 14.

The tooling exchange mechanism 15 is composed of the tooling holding unit 100 mounted to the turret 12 and the tooling detachment unit 200 provided on the turret support 13.

<2. Tooling Structure>

Here, the tooling T mounted to the tooling holding unit 100 will be described with reference to FIG. 3.

Figure 3:
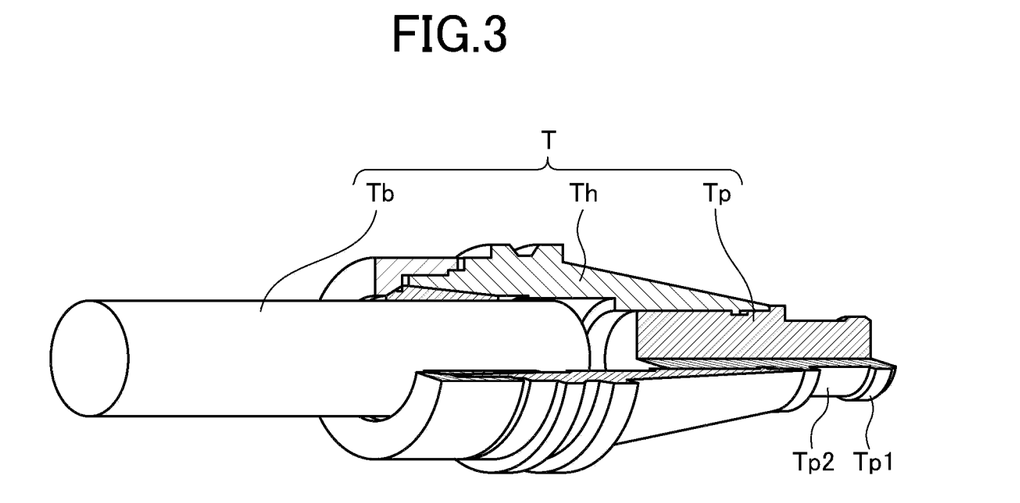
FIG. 3 is a partially cross-sectional perspective view of a tooling illustrated in FIG. 1.

FIG. 3 is a partially cross-sectional perspective view of the tooling illustrated in FIG. 1.

The tooling T includes a rotary tool Tb such as a drill for machining a workpiece, a tool holder Th for detachably holding the rotary tool Tb, and a pull stud Tp attached to the rear end of the tool holder Th.

The tool holder Th has a diameter that is reduced toward the rear end side, that is, is tapered toward the rear end side.

The pull stud Tp is inserted and fixed into a through hole formed at the rear end of the tool holder Th, and is composed of a head portion Tp1 on the rear end side and a constricted portion Tp2 connected to the front side of the head portion Tp1 and having a smaller diameter than the head portion Tp1.

<3. Structure of a Tooling Holding Unit>

Figure 4:
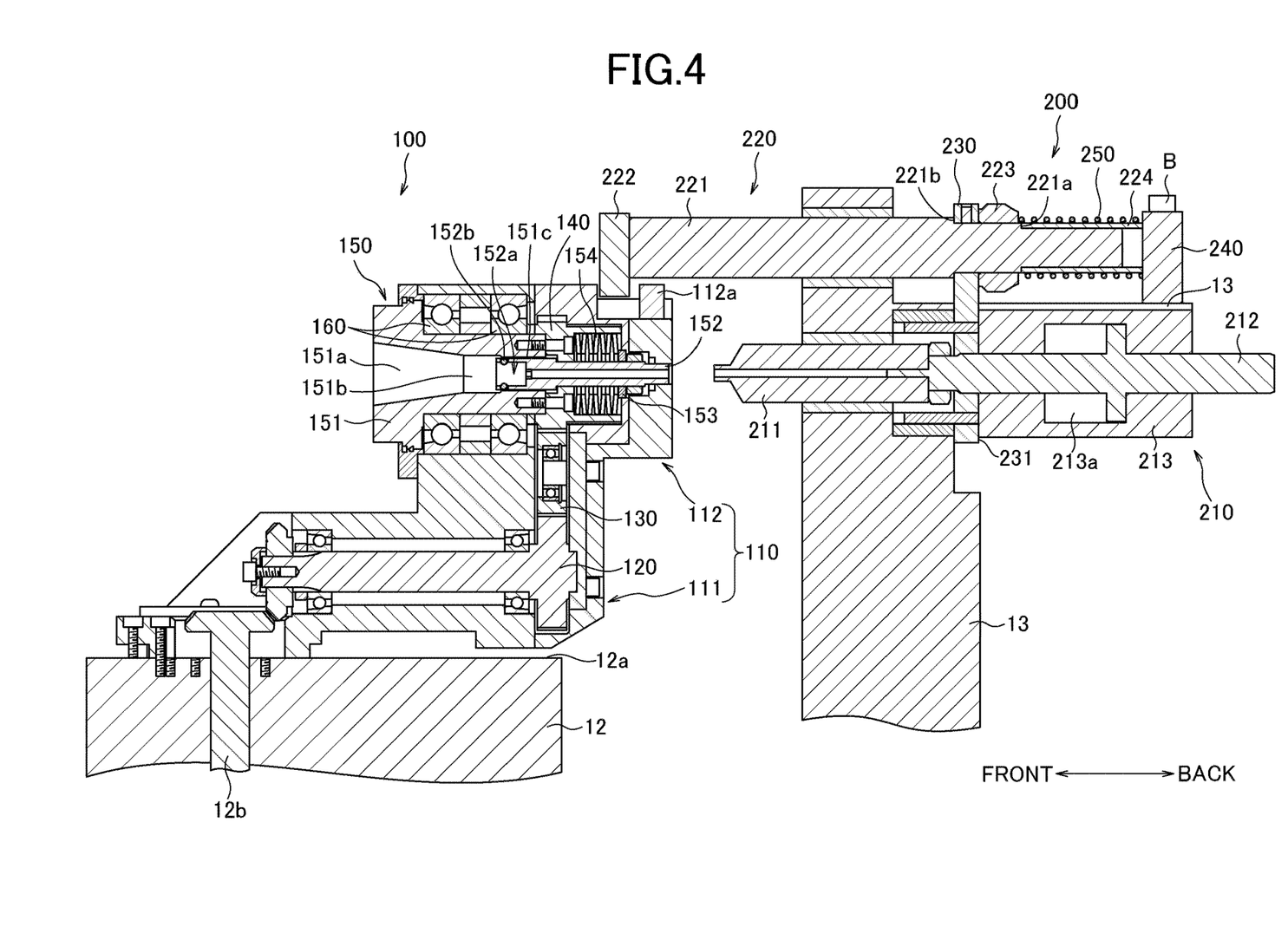
FIG. 4 is a sectional view taken along the line IV-IV of FIG. 2.

Next, the tooling holding unit 100 will be described with reference to FIGS. 3 and 4. FIG. 4 is a sectional view taken along the line IV-IV of FIG. 2.

The tooling holding unit 100 includes a housing 110, a first rotational driving force transmission shaft 120 that engages with a rotational driving force transmission shaft 12b projecting from the turret 12, a transmission gear 130 that engages with the first rotational driving force transmission shaft 120, a second rotational driving force transmission shaft 140 that engages with the transmission gear 130, and a tool holder holding portion 150 attached to the tip of the second rotational driving force transmission shaft 140.

As shown in FIG. 4, the housing 110 is formed of a base portion 111 that extends in the front-back direction and is attached to the turret 12, and a rising portion 112 that rises from the base portion 111 in the direction away from the rotation axis of the turret 12. The housing 110 has an inverted L shape.

An engaging projection 112a is formed at an upper portion on the rear end side of the rising portion 112 so as to project away from the rotation axis of the turret 12.

The first rotational driving force transmission shaft 120 is rotatably provided inside the base portion 111 of the housing 110 and extends in the front-back direction.

On the front end side of the first rotational driving force transmission shaft 120, a bevel gear engaging with a bevel gear formed at the tip of the rotational driving force transmission shaft 12b is formed.

Further, on the rear end side of the first rotational driving force transmission shaft 120, a gear engaging with the transmission gear 130 is formed.

The transmission gear 130 is rotatable around an axis parallel to the rotation axis of the turret 12.

The second rotational driving force transmission shaft 140 is a cylindrical hollow shaft rotatably provided on the rear end side inside the rising portion 112 of the housing 110 and extends in the front-back direction.

The tool holder holding portion 150 is rotatably held with respect to the rising portion 112 of the housing 110 by a bearing 160 provided inside the rising portion 112 of the housing 110.

The tool holder holding portion 150 includes a cylindrical holder 151 connected to the second rotational driving force transmission shaft 140, a draw bar 152 inserted into the rear end of the cylindrical holder 151, a collar 153 fixed to the draw bar 152, and a draw bar biasing spring 154 for biasing the collar 153.

The cylindrical holder 151 includes a tooling insertion portion 151a into which the tool holder Th of the tooling T is inserted, an intermediate portion 151b that communicates with the rear end of the tooling insertion portion 151a and extends toward the rear end side with the same diameter, and a draw bar insertion portion 151c that communicates with the rear end of the intermediate portion 151b and into which the draw bar 152 is inserted.

The inner diameter of the tooling insertion portion 151a is reduced toward the rear end side, that is, the inside of the tooling insertion portion 151a is tapered toward the rear end side.

The taper of the tool holder Th of the tooling T is formed so as to match the taper of the tooling insertion portion 151a.

The diameter of the intermediate portion 151b is slightly larger than the diameter of the rear end of the tool holder Th of the tooling T.

The diameter of the draw bar insertion portion 151c is smaller than the diameter of the intermediate portion 151b.

The draw bar 152 is a cylindrical rod and has a recessed tooling accommodation area 152a at the tip thereof.

In addition, a plurality of engagement ball accommodation holes into which a plurality of engagement balls 152b are fitted are formed at intervals on the outer peripheral wall of the tooling accommodation area 152a.

the engagement ball accommodating holes have different diameters between on the outer peripheral side and on the inner peripheral side. The hole diameter on the outer peripheral side is approximately equal to the diameter of the engagement ball 152b, and the hole diameter on the inner peripheral side is smaller than the diameter of the engagement ball 152b.

As described above, when the tip of the draw bar 152 is positioned at the intermediate portion 151b of the cylindrical holder 151, it is possible to be in a state where the engagement ball 152b does not project toward the inside of the draw bar 152 by moving toward the outside of the draw bar 152.

Further, when the tip of the draw bar 152 is positioned at the draw bar insertion portion 151c of the cylindrical holder 151, the engagement ball 152b comes into contact with the wall surface forming the draw bar insertion portion 151c, so that the engagement ball 152b projects toward the inside of the draw bar 152.

In this state, the inner diameter of the tip of the draw bar 152 is smaller than the diameter of the head portion Tp1 of the pull stud Tp of the tooling T and larger than the diameter of the constricted portion Tp2 of the pull stud Tp of the tooling T.

Therefore, when the tooling T is held in the tool holder holding portion 150, the tooling T is inserted into the tooling insertion portion 151a in a state where the draw bar 152 is pushed until the tip of the draw bar 152 is positioned at the intermediate portion 151b of the cylindrical holder 151.

At this time, the engagement ball 152b once projects outward of the draw bar 152 by the head portion Tp1, and then comes to a position facing the constricted portion Tp2, and the head portion Tp1 of the pull stud Tp of the tooling T is accommodated in the tooling accommodation area 152a.

In this state, if the draw bar 152 is moved backward until the tip of the draw bar 152 is positioned at the draw bar insertion portion 151c of the cylindrical holder 151, the engagement ball 152b projects toward the inside of the draw bar 152 and comes into contact with the constriction portion Tp2 of the pull stud Tp of the tooling T.

As a result, the tooling T is held by the tool holder holding portion 150 unless the draw bar 152 is pushed until the tip of the draw bar 152 is positioned at the intermediate portion 151b of the cylindrical holder 151.

The draw bar biasing spring 154 biases the draw bar 152 rearward via the collar 153.

That is, the draw bar 152 retracts the tooling T while the pull stud Tp of the tooling T is held by the biasing force of the draw bar biasing spring 154.

Therefore, the tool holder Th is mounted to the tool holder holding portion 150 in a state where the tool holder Th of the tooling T is retracted.

<4. Structure of a Tooling Detachment Unit>

Next, the tooling detachment unit 200 will be described with reference to FIGS. 4 and 5.

Figure 5:
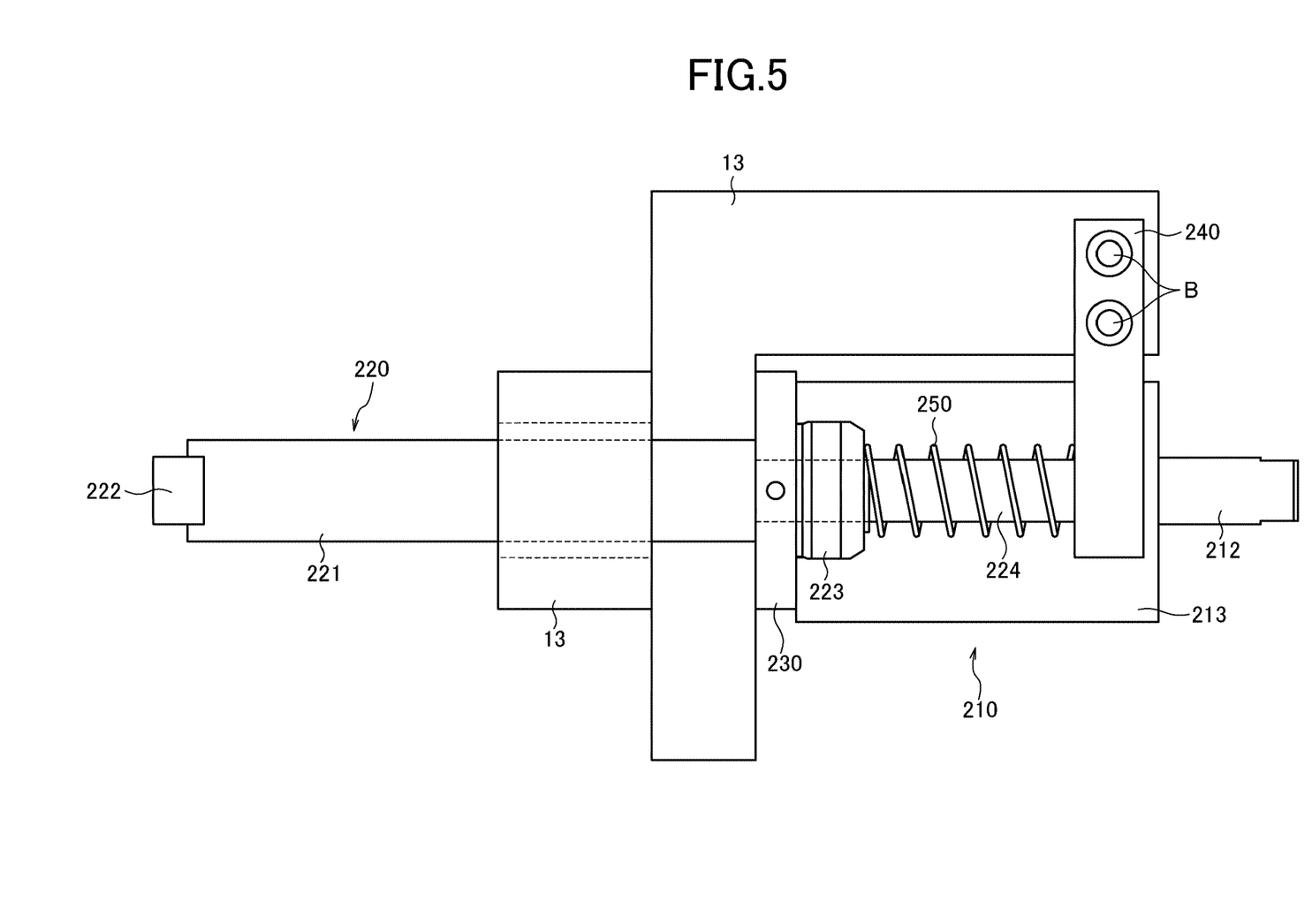
FIG. 5 is a plan view of the turret and a turret support viewed from the direction V in FIG. 2.

FIG. 5 is a plan view of the turret and the turret support viewed from the direction V in FIG. 2.

The tooling detachment unit 200 includes a pressing member 210 that is movable forward and backward in the direction toward the rear end of the tooling holding unit 100, a locking lever 220 that is movable forward and backward and parallel to the moving direction of the pressing member 210, a connecting plate 230 that connects the pressing member 210 and the locking lever 220, a base 240 that is attached to the turret support 13 and serves as a fixed end, and a coil spring (elastic member) 250 that biases the connecting plate 230 forward.

As shown in FIG. 4, the pressing member 210 is composed of a piston rod 211 inserted through the turret support 13, a cylinder rod 212 connected to the rear end of the piston rod 211, and a cylinder 213 for moving the cylinder rod 212 forward and backward.

The piston rod 211 faces the rear end of the draw bar 152 of the tooling holding unit 100 when the turret 12 is indexed and rotated until the tooling holding unit 100 reaches a position (tooling exchange position) P where the tooling holding unit 100 faces the tooling storage device 14.

The cylinder 213 is a hydraulic cylinder in which hydraulic oil is filled in a cylinder chamber 213a.

The cylinder 213 allows the cylinder rod 212 (that is, the piston rod 211) to move forward and backward by adjusting the amount of working oil in the cylinder chamber 213a with a pump (not shown).

Since the pressing member 210 is configured in this way, the pressing member 210 can press the rear end of the draw bar 152 of the tooling holding unit 100 to release the retracted state of the tool holder Th of the tooling T by the tool holder holding portion 150 of the tooling holding unit 100.

On the other hand, as shown in FIG. 4, the locking lever 220 includes a lever body 221 inserted through the turret support 13 and the connecting plate 230, a projecting member 222 attached to the tip of the lever body 221, a spring receiving member 223 that comes into contact with the coil spring 250, and a sleeve 224 into which the rear end of the lever body 221 is inserted.

The lever body 221 is a stepped round bar and extends in the same direction as the piston rod 211 of the pressing member 210.

The projecting member 222 projects from the lever body 221 toward the rotation axis of the turret 12.

Further, the projecting member 222 faces the engaging projection 112a of the tooling holding unit 100 when the turret 12 is indexed and rotated until the tooling holding unit 100 reaches the tooling exchange position P.

As shown in FIGS. 4 and 5, the spring receiving member 223 is attached to the lever body 221 and integrated with the lever body 221.

Further, as shown in FIG. 4, the rear end of the spring receiving member 223 is in contact with the coil spring 250 and biased forward.

As shown in FIG. 4, the left end of the sleeve 224 is in contact with a right shoulder 221a forming the right step of the lever body 221, and the right end of the sleeve 224 is in contact with the base 240.

Since the locking lever 220 is configured in this way, the locking lever 220 can be engaged with the engaging projection 112a formed on the rear end side of the tooling holding unit 100.

The connecting plate 230 is a single plate, through which the cylinder rod 212 of the pressing member 210 and the lever body 221 of the locking lever 220 are inserted, as shown in FIG. 4.

The cylinder 213 of the pressing member 210 is attached to a rear surface 231 of the connecting plate 230.

Further, the connecting plate 230 is clamped between a left shoulder 221b, which is the left step of the lever body 221, and the spring receiving member 223.

Therefore, the cylinder 213 and the locking lever 220 of the pressing member 210 move forward and backward integrally with the connecting plate 230.

The base 240 is fixed to the turret support 13 by fixing bolts B, as shown in FIG. 5.

This base 240 is separated from the cylinder 213 of the pressing member 210.

As shown in FIG. 4, the coil spring 250 covers the outer periphery of the sleeve 224 of the locking lever 220 and biases the tooling detachment unit 200 itself forward via the connecting plate 230.

The coil spring 250 biases forward the locking lever 220 moving integrally with the tooling detachment unit 200.

<5. A tooling exchange procedure>

Next, a tooling exchange procedure by the machine tool 10 and the tooling exchange mechanism 15 configured as described above will be described with reference to FIGS. 2, 4 and 6A to 6D.

FIGS. 6A to 6D are diagrams for explaining the tooling exchange procedure by the tooling exchange mechanism.

First, the turret 12 is indexed and rotated to bring the tooling holding unit 100 holding the tooling T to the tooling exchange position P (see FIG. 2).

Figure 6A:
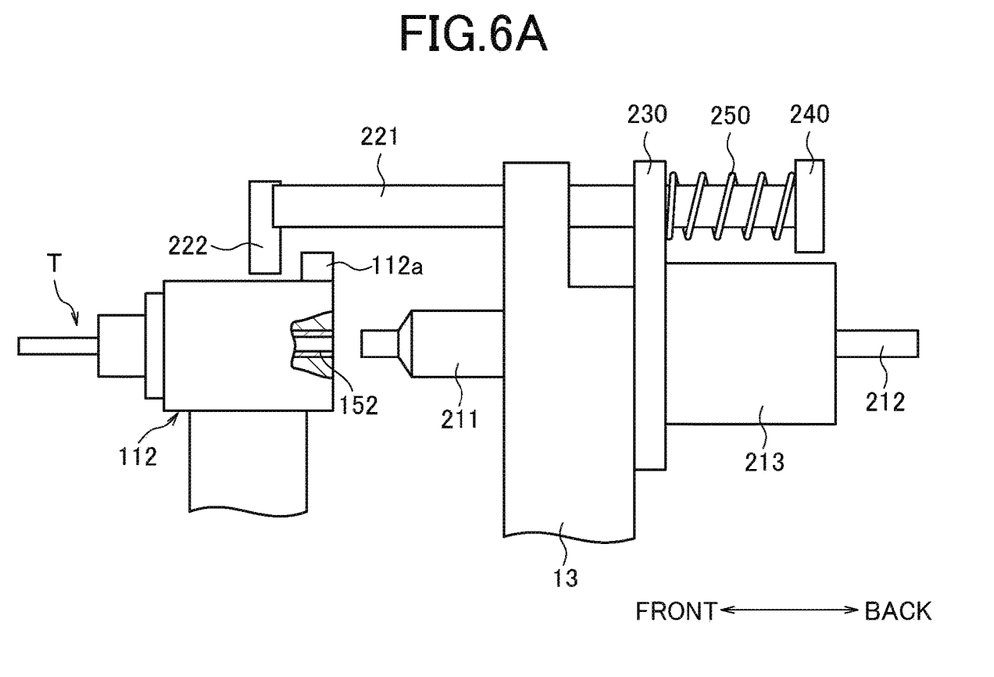
FIG. 6A is a diagram for explaining the tooling exchange procedure by the tooling exchange mechanism.

FIG. 6A is a diagram schematically showing this state.

At this time, the connecting plate 230 is biased forward by the coil spring 250 and is in contact with the turret support 13.

Therefore, when the tooling holding unit 100 reaches the tooling exchange position P, the engaging projection 112a of the tooling holding unit 100 and the projecting member 222 of the locking lever 220 are surely spaced apart and face each other as shown in FIG. 6A.

From the state of FIG. 6A, hydraulic oil is flown into the cylinder 213 by the pump (not shown) to push forward the cylinder rod 212.

When the cylinder rod 212 is pushed forward, the piston rod 211 connected with the cylinder rod 212 also moves forward.

Figure 6B:
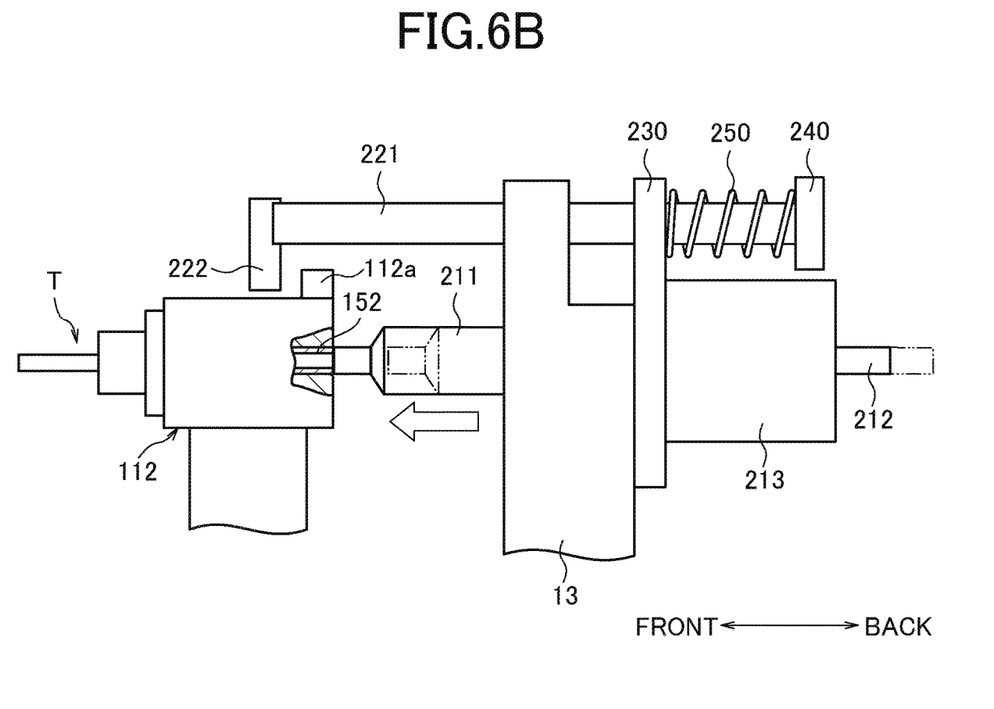
FIG. 6B is a diagram for explaining the tooling exchange procedure by the tooling exchange mechanism.

As the piston rod 211 moves forward, the tip of the piston rod 211 comes into contact with the rear end of the draw bar 152 of the tooling holding unit 100, as shown in FIG. 6B.

If the cylinder rod 212 is tried to be further pushed forward from this state, since the biasing force of the coil spring 250 to the connecting plate 230 (that is, the force pushing the connecting plate 230 forward) is weaker than the biasing force of the draw bar biasing spring 154 (see FIG. 4) to the draw bar 152 (that is, the force pushing the draw bar 152 backward), the draw bar 152 does not move forward.

The reaction force from the draw bar 152 at this time is transmitted to the inside of the cylinder chamber 213a via the piston rod 211, and the hydraulic oil in the cylinder chamber 213a pushes backward the rear wall of the cylinder chamber 213a. Thus, the cylinder 213 moves backward relative to the cylinder rod 212.

Since the cylinder 213 is integrated with the connecting plate 230, the connecting plate 230 also moves backward as the cylinder 213 moves backward.

Since the connecting plate 230 is integrated with the locking lever 220, the locking lever 220 also moves backward as the connecting plate 230 moves backward.

Therefore, after the pressing member 210 of the tooling detachment unit 200 comes into contact with the rear end of the tooling holding unit 100, the reaction force, which the pressing member 210 receives from the tooling holding unit 100, is greater than the biasing force of the coil spring 250.

Figure 6C:
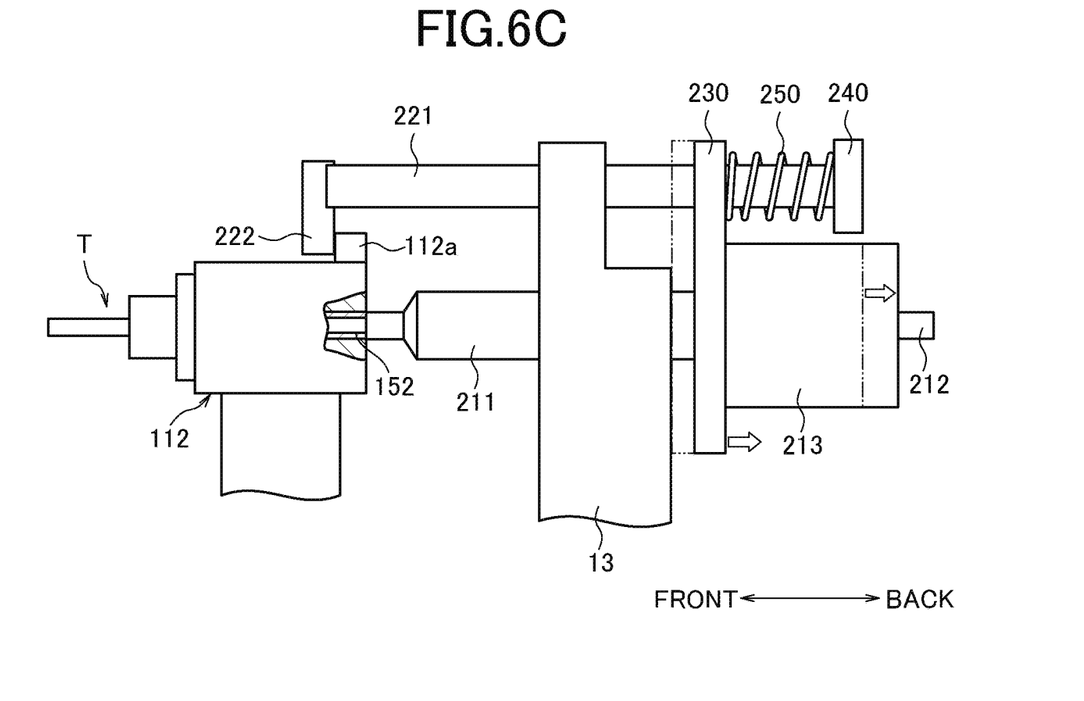
FIG. 6C is a diagram for explaining the tooling exchange procedure by the tooling exchange mechanism.

As the locking lever 220 moves backward, the projecting member 222 of the locking lever 220 comes into contact and is engaged with the engaging projection 112a of the tooling holding unit 100, as shown in FIG. 6C.

From this state, if the cylinder rod 212 is tried to be further pushed forward, since the projecting member 222 of the locking lever 220 is engaged with the engaging projection 112a of the tooling holding unit 100, and since the turret 12 cannot move forward and backward relative to the turret support 13, the connecting plate 230 cannot move backward any further.

Since the pressing force to the draw bar 152 by the pressing member 210 is greater than the biasing force to the draw bar 152 by the draw bar biasing spring 154 (see FIG. 4), the draw bar 152 moves forward while the pressing member 210 and the engaging projection 112a of the tooling holding unit 100 are engaged with each other.

Figure 6D:
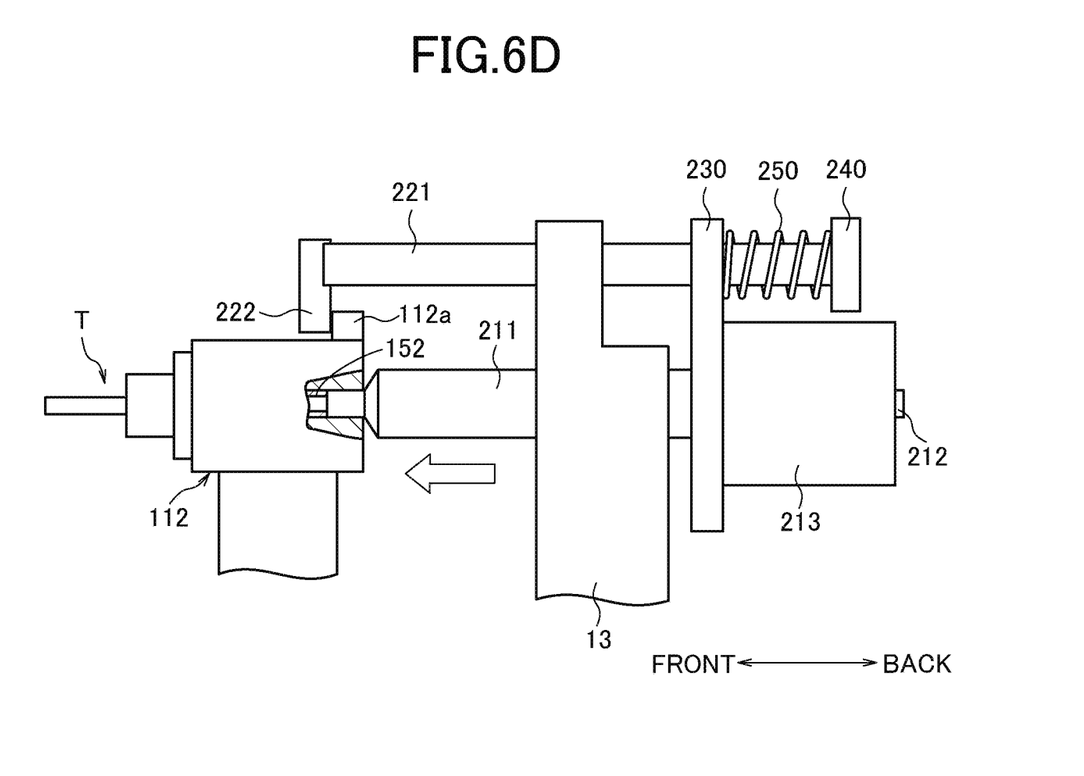
FIG. 6D is a diagram for explaining the tooling exchange procedure by the tooling exchange mechanism.

When the draw bar 152 moves forward and the tip of the draw bar 152 reaches the intermediate portion 151b (see FIG. 4) of the cylindrical holder 151, the engagement between the engagement ball 152b of the draw bar 152 and the pull stud Tp of the tooling T is released, and the retracted state of the tool holder Th of the tooling T by the tool holder holding portion 150 of the tooling holding unit 100 is released.

In a state where the retracted state of the tool holder Th is released, the tooling storage device 14 and the turret 12 move closer to each other, the shutter 14a of the tooling storage device 14 opens, and the tooling T is stored in the tooling storage device 14.

Then, a desired tooling is selected from a plurality of toolings in the tooling storage device 14.

The tool holder holding portion 150 of the turret 12 then retracts and holds a new tooling selected in the tooling storage device 14.

As described above, the tooling T is exchanged between the tooling storage device 14 and the turret 12.

Then, the tooling storage device 14 and the turret 12 are moved away from each other, and the turret 12 proceeds to the next machining step or the like.

<6. Effects of the Machine Tool of the Present Example>

As described above, according to the machine tool 10 and the tooling exchange mechanism 15 in the example of the present invention, after the pressing member 210 comes into contact with the rear end of the tooling holding unit 100, while the projecting member 222 projecting from the locking lever 220 is engaged with the engaging projection 112a, the pressing member 210 moves forward to release the retracted state of the tool holder Th of the tooling T by the tool holder holding portion 150 so that the tooling T can be exchanged. Thus, while the pressing member 210 presses forward the rear end side of the tooling holding unit 100, the locking lever 220 pulls backward the engaging projection 112a. Therefore, the bending moment applied to the turret 12 can be canceled, and the load applied to the turret 12 can be reduced when changing the tooling.

Further, the tooling detachment unit 200 includes the coil spring 250 of an elastic member for biasing the tooling detachment unit 200 itself toward the turret 12. Thus, before the pressing member 210 comes into contact with the rear end of the tooling holding unit 100, the locking lever 220 is held in a position forward of the engaging projection 112a. Therefore, it is possible to prevent the locking lever 220 from coming into contact with the engaging projection 112a due to vibrations generated during machining of the workpiece W.

Further, after the pressing member 210 comes into contact with the rear end of the tooling holding unit 100, reaction force, which the pressing member 210 receives from the tooling holding unit 100, is greater than the biasing force of the coil spring 250. Thus, after the pressing member 210 comes into contact with the rear end of the tooling holding unit 100, the locking lever 220 is engaged with the engaging projection 112a, and the pressing member 210 moves forward in that state. Therefore, the retracted state of the tool holder Th of the tooling T can be released in a state where the bending moment applied to the turret 12 is canceled.

Although the example of the present invention has been described above, the present invention is not limited to the above example.

For example, in the present example, the turret 12 is formed with eight turret surfaces 12a, but the number of turret surfaces formed on the turret is not limited to eight.

REFERENCE SIGNS LIST 10 machine tool
10a machining chamber
11 spindle
12 turret
12a turret surface
12b rotational driving force transmission shaft
13 turret support
14 tooling storage device
14a shutter
15 tooling exchange mechanism
100 tooling holding unit (tooling holder)
110 housing
111 base portion
112 rising portion
112a engaging projection
120 first rotational driving force transmission shaft
130 transmission gear
140 second rotational driving force transmission shaft 150 Tool holder holding portion
151 cylindrical holder
151a tooling insertion portion
151b intermediate portion
151c draw bar insertion portion
152 draw bar
152a tooling accommodation area
152b engagement ball
153 collar
154 draw bar biasing spring
160 bearing
200 tooling detachment unit (tool detacher)
210 pressing member
211 piston rod
212 cylinder rod
213 cylinder
213a cylinder chamber
220 locking lever
221 lever body
221a right shoulder
221b left shoulder
222 projecting member
223 spring receiving member
224 sleeve
230 connecting plate
231 rear surface
240 base
250 coil spring (elastic member)
T tooling
Tb rotary tool
Th tool holder
Tp pull stud
Tp1 head portion
Tp2 constricted portion
W workpiece
H tool holder
B fixing bolt
P tooling exchange position

The invention claimed is:

1. A tooling exchange mechanism for a machine tool comprising:
a turret mounted with a tooling holder detachably holding a tooling including a rotary tool for machining a workpiece and a tool holder for detachably holding the rotary tool; and
a turret support including a tooling detacher detaching the tooling mounted to the tooling holder from the tooling holder, wherein
the tooling holder mounted to the turret includes a tool holder holding portion for mounting the tool holder in a state where the tool holder of the tooling is retracted,
the tooling detacher of the turret support includes a pressing member that is movable forward and backward in the direction to the rear end of the tooling holder and a locking lever that is movable forward and backward in the direction parallel to the moving direction of the pressing member,
the pressing member of the tooling detacher is configured to press the rear end of the tooling holder to be able to release the retracted state of the tool holder of the tooling by the tool holder holding portion of the tooling holder,
the locking lever of the tooling detacher is engageable with an engaging projection formed on the rear end side of the tooling holder, and
the turret and the turret support are configured such that, after the pressing member of the tooling detacher comes into contact with the rear end of the tooling holder, while the locking lever of the tooling detacher detachment is engaged with the engaging projection of the tooling holder, the pressing member of the tooling detacher detachment is configured to move forward to release the retracted state of the tool holder of the tooling by the tool holder holding portion of the tooling holder so that the tooling can be exchanged.

2. The tooling exchange mechanism for a machine tool according to claim 1, wherein the tooling detacher includes an elastic member configured to bias at least a portion of the tooling detacher toward the turret.

3. The tooling exchange mechanism for a machine tool according to claim 2, wherein the turret and the turret support are configured such that, after the pressing member of the tooling detacher comes into contact with the rear end of the tooling holder, a reaction force which the pressing member receives from the tooling holder is greater than the biasing force of the elastic member.

4. A machine tool comprising:
a tooling exchange mechanism according to claim 2;
a spindle for rotatably gripping the workpiece; and
a tooling storage device for storing the tooling,
wherein the turret and the turret support are configured such that, after the turret is rotated to a predetermined tooling exchange position, the pressing member of the tooling detacher is configured to press the rear end side of the tooling holder forward, and the locking lever of the tooling detacher is configured to pull the engaging projection of the tooling holder backward.

5. A machine tool comprising:
a tooling exchange mechanism according to claim 1;
a spindle for rotatably gripping the workpiece; and
a tooling storage device for storing the tooling,
wherein the turret and the turret support are configured such that, after the turret is rotated to a predetermined tooling exchange position, the pressing member of the tooling detacher is configured to press rear end side of the tooling holder forward, and the locking lever of the tooling detacher is configured to pull the engaging projection of the tooling holder backward.

6. A machine tool comprising:
a tooling exchange mechanism according to claim 3;
a spindle for rotatably gripping the workpiece; and
a tooling storage device for storing the tooling,
wherein the turret and the turret support are configured such that, after the turret is rotated to a predetermined tooling exchange position, the pressing member of the tooling detacher is configured to press the rear end side of the tooling holder forward, and the locking lever of the tooling detacher is configured to pull the engaging projection of the tooling holder backward.

* * * * *